United States Patent
Kawachi et al.

(10) Patent No.: US 8,221,920 B2
(45) Date of Patent: Jul. 17, 2012

(54) SEPARATOR FOR VALVE REGULATED LEAD-ACID BATTERY AND VALVE REGULATED LEAD-ACID BATTERY

(75) Inventors: Masahiro Kawachi, Tokyo (JP); Shoji Sugiyama, Tokyo (JP); Takashi Shidomi, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 969 days.

(21) Appl. No.: 12/078,102

(22) Filed: Mar. 27, 2008

(65) Prior Publication Data
US 2008/0241662 A1 Oct. 2, 2008

(30) Foreign Application Priority Data

Mar. 29, 2007 (JP) .................... 2007-089064

(51) Int. Cl.
*H01M 2/16* (2006.01)
*H01M 2/14* (2006.01)

(52) U.S. Cl. ........ 429/247; 429/249; 429/253; 429/254; 429/129

(58) Field of Classification Search .................. 429/247, 429/249, 250, 251, 253, 254, 129, 142; 428/113, 428/190, 200, 211.1, 210, 296.7, 293.4
See application file for complete search history.

(56) References Cited

U.S. PATENT DOCUMENTS
2002/0165291 A1* 11/2002 Choi .......................... 522/114

FOREIGN PATENT DOCUMENTS
JP 11-016560 * 1/1999

* cited by examiner

*Primary Examiner* — Raymond Alejandro
(74) *Attorney, Agent, or Firm* — Kratz, Quintos & Hanson, LLP

(57) ABSTRACT

A separator for a valve regulated lead-acid battery which comprises a paper sheet where very fine glass fiber is a main component, which has a piercing strength (puncture strength) of 4.5 N/mm or more and a tensile strength of 7.0 N/10 mm² or more. The paper sheet is made by blending 80 to 90% by weight of glass fiber having 1.5 μm or less average fiber size, 5 to 10% by weight of single-material monofilament-form thermally non-adhesive organic fiber (non-heat-bondable organic fiber) and 5 to 10% by weight of single-material monofilament-form thermally adhesive organic fiber (heat-bondable organic fiber) comprising the same kind of material as in the thermally non-adhesive organic fiber in a wet paper-making process whereupon the fiber materials are bonded each other by thermal fusion of the thermally adhesive organic fiber whereby a coat (film) by melting of the organic fiber is not substantially formed on the surface of the glass fiber.

2 Claims, No Drawings

SEPARATOR FOR VALVE REGULATED LEAD-ACID BATTERY AND VALVE REGULATED LEAD-ACID BATTERY

BACKGROUND OF THE INVENTION

1. Field of the Invention

The present invention relates to a separator for a valve regulated lead-acid battery which comprises a paper sheet manufactured by a wet papermaking process mainly comprising very fine glass fiber and has both functions as a retainer (holding material) for electrolytic solution and as a partition; and also relates to a valve regulated lead-acid battery using the same.

2. Description of the Related Art

With regard to a separator for valve regulated lead-acid battery, a separator comprising a paper sheet manufactured by a wet papermaking process constituted from very fine glass fiber only or from a sheet very fine glass fiber and a small amount of a binder only has been mostly used up to now. Recently however, there has been an increasing demand for mechanical strength as a result of automation of lines for assembling the batteries.

In the conventional separators which comprise a paper sheet manufactured by a wet papermaking process being constituted only from very fine glass fiber or only from very fine glass fiber together with a small amount of a binder, their mechanical strength is weak and it is difficult for them to comply with the automation in the assembly lines for batteries.

Further, in recent years, there have been many cases where a plate group (where a separator is incorporated between positive and negative plates) is assembled under high compression and inserted into a container in view of tendency of long life and high efficiency of a valve regulated lead-acid battery whereby, as a result of assembling of batteries under high compression, unevenness of the plate surface (or a big convex) and breakage of a separator by edges of plate grid (plate of an expanded grid) are becoming new problems. Therefore, it is necessary that a piercing strength (puncture strength) of a separator is high in order to prepare a separator where breakage of a separator due to unevenness of the plate surface or to edges of plate grid hardly happens even when assembling of batteries are conducted under high compression. It is difficult to prepare a separator having such a high piercing strength (puncture strength) in the case of the mainstream separator of a paper sheet prepared by a wet papermaking process being constituted only from very fine glass fiber or only from very fine glass fiber together with a small amount of a binder or, particularly, a separator being constituted only from very fine glass fiber.

Under such circumstances, the Patent Document 1 proposes a separator where very fine glass fiber is blended with a monofilament-form synthetic fiber such as polyethylene terephthalate fiber and a pulp-form organic fiber such as polyethylene synthetic pulp in a wet papermaking process whereby a compressive breakage strength and a piercing strength (puncture strength) are enhanced and breakage of a separator due to unevenness of plate surface or to edges of plate grid hardly happens even when assembling of batteries is conducted under high compression. However, even if a separator is constructed by such a material constitution, although the compressive breakage strength is enhanced, a tensile strength and a piercing strength (puncture strength) are not enhanced so much and, accordingly, breakage of a separator due to unevenness of plate surface or to edges of plate grid in the actual assembling of batteries under high compression is unable to be well prevented. Thus, in the separator of the Patent Document 1, although it is mentioned that a piercing strength (puncture strength) of a separator is able to be enhanced by addition of a pulp-form organic fiber such as synthetic pulp of polyethylene, short-circuit of separators and troubles in assembling are still generated depending upon the state of the plates of the assembling battery and the state of the battery assembly lines.

With regard to a binder which is able to give a tensile strength by bonding of glass fibers each other in a paper sheet manufactured by a wet papermaking process of very fine glass fiber, there have been already known an organic binder such as a resin emulsion or a pulp-form organic fiber mentioned in the Patent Document 1. However, in the separator using such a organic binder, the binder component forms a coat (film) as if it covers the surface of the glass fiber whereby there are problems that wetting of the glass fiber with respect to an electrolytic solution is inhibited, wetting of the separator with respect to an electrolytic solution is significantly inhibited and a property of the separator for holding the electrolytic solution lowers.

Patent Document 1: Japanese Patent Laid-Open No. 11/016,560 A

SUMMARY OF THE INVENTION

Thus, in view of the conventional problems as mentioned above, an object of the invention is to provide a separator for a valve regulated lead-acid battery which comprises a paper sheet made by a wet papermaking process where very fine glass fiber is a main component, characterized in that, the separator for a valve regulated lead-acid battery where good wetting with respect to an electrolytic solution is maintained and, even when assembling of a battery under high compression is carried out, breakage of a separator due to unevenness of plate surface and to edges of plate grid hardly happens and short-circuit upon assembling the battery and troubles upon assembling hardly happens and also to provide a valve regulated lead-acid battery as such.

In order to achieve the above object, a separator for a valve regulated lead-acid battery in accordance with the invention is characterized in that, as mentioned in the first aspect of the invention, the separator which has a piercing strength (puncture strength) of 4.5 N/mm or more and a tensile strength of 7.0 N/10 mm$^2$ or more which comprises a paper sheet through wet papermaking process in which 80 to 90% by weight of glass fiber having 1.5 μm or less average fiber size, 5 to 10% by weight of single-material monofilament-form thermally non-adhesive organic fiber (non-heat-bondable organic fiber) and 5 to 10% by weight of single-material monofilament-form thermally adhesive organic fiber (heat-bondable organic fiber) comprising the same kind of material as in the above monofilament-form thermally non-adhesive organic fiber (non-heat-bondable organic fiber) are blended in a wet papermaking process whereupon the fiber materials of the above glass fiber and the above monofilament-form thermally non-adhesive organic fiber (non-heat-bondable organic fiber) are bonded each other by thermal fusion of the above monofilament-form thermally adhesive organic fiber (heat-bondable organic fiber) whereby a coat (film) by melting of the above organic fiber is not substantially formed on the surface of the above glass fiber.

Further, in order to achieve the above-mentioned object, the valve regulated lead-acid battery in accordance with the invention is that, as mentioned in the second aspect of the invention, it is characterized in using the separator mentioned in the first aspect of the invention.

In accordance with the invention, in a separator for a valve regulated lead-acid battery, the separator is constituted in such a manner that it has a piercing strength (puncture strength) of 4.5 N/mm or more and a tensile strength of 7.0 N/10 mm² or more which comprises a paper sheet through wet papermaking process in which 80 to 90% by weight of glass fiber having 1.5 μm or less average fiber size, 5 to 10% by weight of single-material monofilament-form thermally non-adhesive organic fiber (non-heat-bondable organic fiber) and 5 to 10% by weight of single-material monofilament-form thermally adhesive organic fiber (heat-bondable organic fiber) comprising the same kind of material as in the above monofilament-form thermally non-adhesive organic fiber (non-heat-bondable organic fiber) are blended in a wet papermaking process whereupon the fiber materials of the above glass fiber and the above monofilament-form thermally non-adhesive organic fiber (non-heat-bondable organic fiber) are bonded each other by thermal fusion of the above monofilament-form thermally adhesive organic fiber (heat-bondable organic fiber) whereby a coat (film) by melting of the above organic fiber is not substantially formed on the surface of the above glass fiber. As a result, it is now possible to provide a separator for a valve regulated lead-acid battery where good wetting with respect to an electrolytic solution is not inhibited and, even when assembling of a battery under high compression is carried out, breakage of a separator due to unevenness of plate surface and to edges of plate grid hardly happens and short-circuit upon assembling the battery and troubles upon assembling hardly happen.

DETAILED DESCRIPTION OF THE PREFERRED EMBODIMENTS

The separator for a valve regulated lead-acid battery in accordance with the invention is necessary to be a separator which has a piercing strength (puncture strength) of 4.5 N/mm or more and a tensile strength of 7.0 N/10 mm² or more which comprises a paper sheet through wet papermaking process in which 80 to 90% by weight of glass fiber having 1.5 μm or less average fiber size, 5 to 10% by weight of single-material monofilament-form thermally non-adhesive organic fiber (non-heat-bondable organic fiber) and 5 to 10% by weight of single-material monofilament-form thermally adhesive organic fiber (heat-bondable organic fiber) comprising the same kind of material as in the above monofilament-form thermally non-adhesive organic fiber (non-heat-bondable organic fiber) are blended in a wet papermaking process whereupon the fiber materials of the above glass fiber and the above monofilament-form thermally non-adhesive organic fiber (non-heat-bondable organic fiber) are bonded each other by thermal fusion of the above monofilament-form thermally adhesive organic fiber (heat-bondable organic fiber) whereby a coat (film) by melting of the above organic fiber is not substantially formed on the surface of the above glass fiber.

An object of the invention is to prepare a separator for a valve regulated lead-acid battery which comprises a paper sheet made by a wet papermaking process where very fine glass fiber is a main component in which the separator for a valve regulated lead-acid battery where good wetting with respect to an electrolytic solution is maintained and, even when assembling of a battery under high compression is carried out, breakage of a separator due to unevenness of plate surface and to edges of plate grid hardly happens and short-circuit upon assembling the battery and troubles upon assembling hardly happen.

For such a purpose that breakage of a separator due to unevenness of plate surface and to edges of plate grid hardly happens even when assembling of a battery under high compression, it is necessary to make a piercing strength (puncture strength) of a separator high as mentioned already and, in addition, a possibility of the state where breakage of a separator is apt to happen depending upon the state of plate of the assembling battery and also upon the state of an assembly line for batteries is taken into consideration, it has been judged that the piercing strength (puncture strength) of a separator is to be 4.5 N/mm or more.

Further, in order to cope with the automation of an assembly line for batteries, it is necessary to make the tensile strength of a separator high as mentioned already and, in addition, a possibility of the state where breakage of a separator is apt to happen depending upon the state of an assembly line for batteries is taken into consideration, it has been judged that the tensile strength of a separator is to be 7.0 N/10 mm² or more.

Furthermore, in order to ensure a good wetting of a separator with respect to an electrolytic solution, it has been judged to be necessary that the amount of glass fiber which is hydrophilic is made as much as possible, that the amount of organic component (organic fiber) which is hydrophobic is made as small as possible and that formation of a coat (film) by the organic component on the surface of the glass fiber which is hydrophilic is prevented as much as possible.

In view of the above, constitution of the materials for a separator has been made to be 80 to 90% by weight of glass fiber having an average fiber size of 1.5 μm or less, 5 to 10% by weight of single-material monofilament-form thermally non-adhesive organic fiber (non-heat-bondable organic fiber) and 5 to 10% by weight of single-material monofilament-form thermally adhesive organic fiber (heat-bondable organic fiber) comprising the same kind of material as in the above monofilament-form thermally non-adhesive organic fiber (non-heat-bondable organic fiber). Thus, it has been judged that, in order to ensure the piercing strength (puncture strength) of 4.5 N/mm or more for a separator, the single-material monofilament-form thermally non-adhesive organic fiber (non-heat-bondable organic fiber) is to be not less than 5% by weight; in order to ensure the tensile strength of 7.0 N/10 mm² or more for a separator, the single-material monofilament-form thermally adhesive organic fiber (heat-bondable organic fiber) comprising the same kind of material as in the above monofilament-form thermally non-adhesive organic fiber (non-heat-bondable organic fiber) is to be not less than 5% by weight; and, in order to ensure a good wetting of a separator with respect to an electrolytic solution, the total amount of the organic component (organic fiber) which is hydrophobic is to be not more than 20% by weight and the amount of the glass fiber which is hydrophilic is to be not less than 80% by weight.

Further, it has been judged that, in order to ensure a good wetting of a separator with respect to an electrolytic solution, formation of a coat (film) by the organic component on the surface of the glass fiber which is hydrophilic is to be prevented as much as possible whereby, in the paper sheet prepared by a wet papermaking process obtained from the above material constitution, the constitution should be that the fiber materials which are the glass fiber and the monofilament-form thermally non-adhesive organic fiber (non-heat-bondable organic fiber) are to be bonded each other by thermal fusion of the monofilament-form thermally adhesive organic fiber (heat-bondable organic fiber) and moreover that a coat (film) by melting of the organic fiber is not to be substantially formed on the surface of the glass fiber.

With regard to the above-mentioned single-material monofilament-form thermally non-adhesive organic fiber (non-heat-bondable organic fiber), one or more of high-melting (having high softening point) and acid-resisting organic fiber(s) such as polypropylene fiber, polyethylene terephthalate fiber and acrylic fiber may be used. With regard to the above-mentioned single-material monofilament-form thermally adhesive organic fiber (heat-bondable organic fiber), one or more of low-melting (having low softening point) and acid-resisting organic fiber(s) such as polyethylene fiber or copolymerized polyester fiber may be used. It is also necessary that the above monofilament-form thermally non-adhesive organic fiber (non-heat-bondable organic fiber) and the above monofilament-form thermally adhesive organic fiber (heat-bondable organic fiber) are made from the same kind of materials (for example, the former is a polyethylene terephthalate fiber and the latter is a copolymerized polyester fiber, both of which are polyester resin materials, or the former is a polypropylene fiber and the latter is a polyethylene fiber, both of which are polyolefin resin materials) and, in that case, an adhesive action by a thermal fusion of the above monofilament-form thermally adhesive organic fiber (heat-bondable organic fiber) to the above monofilament-form thermally non-adhesive organic fiber (non-heat-bondable organic fiber) is able to be more highly achieved. Here, the term reading single-material fiber means a fiber which comprises a single component such as polypropylene or polyethylene only. Since the separator of the invention contains not less than 5% by weight of the above monofilament-form thermally adhesive organic fiber (heat-bondable organic fiber), preparation of envelope by means of an ultrasonic sealing is possible whereby short-circuit by detachment of active material of plate or short-circuit by a light deformation of plate is able to be prevented and it is now possible to make the battery life long.

EXAMPLES

As hereunder, Examples of the separator for a valve regulated lead-acid battery will be fully illustrated together with Comparative Examples.

Example 1

Very fine glass fiber (84% by weight) of C glass having an average fiber size of 0.6 μm, 8% by weight of monofilament-form polyethylene terephthalate thermally non-adhesive organic fiber (non-heat-bondable organic fiber) (melting point: 245° C.) having an average fiber size of 0.8 dtex and an average fiber length of 5 mm and 8% by weight of monofilament-form copolymerized polyester thermally adhesive organic fiber (heat-bondable organic fiber) (melting point: 110° C.) having an average fiber size of 2.2 dtex and an average fiber length of 5 mm were made into wet paper sheet by a wet papermaking process under an acidic condition of pH 3.0, dried by heating and further heated in a heating furnace at 160° C. for 2 minutes to give a separator for a valve regulated lead-acid battery where thickness was 1.0 mm, basis weight was 160 g/m² and density was 0.160 g/m³. When the resulting separator was observed, although the fiber materials comprising the above glass fiber and the above monofilament-form thermally non-adhesive organic fiber (non-heat-bondable organic fiber) were bonded each other by means of melting of the above monofilament-form thermally adhesive organic fiber (heat-bondable organic fiber), a coat (film) by melting of the above organic fiber was not substantially formed on the surface of the above glass fiber.

Example 2

Very fine glass fiber (80% by weight) of C glass having an average fiber size of 0.6 μm, 10% by weight of monofilament-form polyethylene terephthalate thermally non-adhesive organic fiber (non-heat-bondable organic fiber) (melting point: 245° C.) having an average fiber size of 0.8 dtex and an average fiber length of 5 mm and 10% by weight of monofilament-form copolymerized polyester thermally adhesive organic fiber (heat-bondable organic fiber) (melting point: 110° C.) having an average fiber size of 2.2 dtex and an average fiber length of 5 mm were made into wet paper sheet by a wet papermaking process under an acidic condition of pH 3.0, dried by heating and further heated in a heating furnace at 160° C. for 2 minutes to give a separator for a valve regulated lead-acid battery where thickness was 1.0 mm, basis weight was 160 g/m² and density was 0.160 g/m³. When the resulting separator was observed, although the fiber materials comprising the above glass fiber and the above monofilament-form thermally non-adhesive organic fiber (non-heat-bondable organic fiber) were bonded each other by means of melting of the above monofilament-form thermally adhesive organic fiber (heat-bondable organic fiber), a coat (film) by melting of the above organic fiber was not substantially formed on the surface of the above glass fiber.

Example 3

Very fine glass fiber (90% by weight) of C glass having an average fiber size of 0.6 μm, 5% by weight of monofilament-form polyethylene terephthalate thermally non-adhesive organic fiber (non-heat-bondable organic fiber) (melting point: 245° C.) having an average fiber size of 0.8 dtex and an average fiber length of 5 mm and 5% by weight of monofilament-form copolymerized polyester thermally adhesive organic fiber (heat-bondable organic fiber) (melting point: 110° C.) having an average fiber size of 2.2 dtex and an average fiber length of 5 mm were made into wet paper sheet by a wet papermaking process under an acidic condition of pH 3.0, dried by heating and further heated in a heating furnace at 160° C. for 2 minutes to give a separator for a valve regulated lead-acid battery where thickness was 1.0 mm, basis weight was 160 g/m² and density was 0.160 g/m³. When the resulting separator was observed, although the fiber materials comprising the above glass fiber and the above monofilament-form thermally non-adhesive organic fiber (non-heat-bondable organic fiber) were bonded each other by means of melting of the above monofilament-form thermally adhesive organic fiber (heat-bondable organic fiber), a coat (film) by melting of the above organic fiber was not substantially formed on the surface of the above glass fiber.

Example 4

Very fine glass fiber (85% by weight) of C glass having an average fiber size of 0.6 μm, 9% by weight of monofilament-form polyethylene terephthalate thermally non-adhesive organic fiber (non-heat-bondable organic fiber) (melting point: 245° C.) having an average fiber size of 0.8 dtex and an average fiber length of 5 mm and 6% by weight of monofilament-form copolymerized polyester thermally adhesive organic fiber (heat-bondable organic fiber) (melting point: 110° C.) having an average fiber size of 2.2 dtex and an average fiber length of 5 mm were made into wet paper sheet by a wet papermaking process under an acidic condition of pH 3.0, dried by heating and further heated in a heating furnace at 160° C. for 2 minutes to give a separator for a valve regulated lead-acid battery where thickness was 1.0 mm, basis weight was 160 g/m² and density was 0.160 g/m³. When the resulting separator was observed, although the fiber materials comprising the above glass fiber and the above monofilament-form thermally non-adhesive organic fiber (non-heat-bondable organic fiber) were bonded each other by means of melting of the above monofilament-form thermally adhesive organic fiber (heat-bondable organic fiber), a coat (film) by melting of the above organic fiber was not substantially formed on the surface of the above glass fiber.

Comparative Example 1

Very fine glass fiber (80% by weight) of C glass having an average fiber size of 0.6 μm, 10% by weight of monofilament-form polyethylene terephthalate thermally non-adhesive organic fiber (non-heat-bondable organic fiber) (melting point: 245° C.) having an average fiber size of 0.8 dtex and an average fiber length of 5 mm and 10% by weight of pulp-form polyethylene fiber (melting point: 135° C.) having a freeness of 3.5 sec/g and an average fiber length of 1 mm were made into wet paper sheet by a wet papermaking process under an acidic condition of pH 3.0, dried by heating and further heated in a heating furnace at 160° C. for 2 minutes to give a separator for a valve regulated lead-acid battery where thickness was 1.0 mm, basis weight was 155 g/m$^2$ and density was 0.155 g/m$^3$. When the resulting separator was observed, the fiber materials comprising the above glass fiber and the above monofilament-form thermally non-adhesive organic fiber (non-heat-bondable organic fiber) were bonded each other by means of melting of the above pulp-form organic fiber and a coat (film) by melting of the above pulp-form organic fiber was formed on the surface of the above glass fiber.

Comparative Example 2

Very fine glass fiber (80% by weight) of C glass having an average fiber size of 0.6 μm, 10% by weight of monofilament-form polyethylene terephthalate thermally non-adhesive organic fiber (non-heat-bondable organic fiber) (melting point: 245° C.) having an average fiber size of 0.8 dtex and an average fiber length of 5 mm and 10% by weight of monofilament-form polyethylene thermally adhesive organic fiber (heat-bondable organic fiber) (melting point: 135° C.) having an average fiber size of 2.5 dtex and an average fiber length of 5 mm were made into wet paper sheet by a wet papermaking process under an acidic condition of pH 3.0, dried by heating and further heated in a heating furnace at 160° C. for 2 minutes to give a separator for a valve regulated lead-acid battery where thickness was 1.0 mm, basis weight was 160 g/m$^2$ and density was 0.160 g/m$^3$. When the resulting separator was observed, although the fiber materials comprising the above glass fiber and the above monofilament-form thermally non-adhesive organic fiber (non-heat-bondable organic fiber) were bonded each other by means of melting of the above monofilament-form thermally adhesive organic fiber (heat-bondable organic fiber), a coat (film) by melting of the above organic fiber was not substantially formed on the surface of the above glass fiber.

Comparative Example 3

Very fine glass fiber (87% by weight) of C glass having an average fiber size of 0.6 μm, 3% by weight of monofilament-form polyethylene terephthalate thermally non-adhesive organic fiber (non-heat-bondable organic fiber) (melting point: 245° C.) having an average fiber size of 0.8 dtex and an average fiber length of 5 mm and 10% by weight of monofilament-form copolymerized polyester thermally adhesive organic fiber (heat-bondable organic fiber) (melting point: 110° C.) having an average fiber size of 2.2 dtex and an average fiber length of 5 mm were made into wet paper sheet by a wet papermaking process under an acidic condition of pH 3.0, dried by heating and further heated in a heating furnace at 160° C. for 2 minutes to give a separator for a valve regulated lead-acid battery where thickness was 1.0 mm, basis weight was 160 g/m$^2$ and density was 0.160 g/m$^3$. When the resulting separator was observed, although the fiber materials comprising the above glass fiber and the above monofilament-form thermally non-adhesive organic fiber (non-heat-bondable organic fiber) were bonded each other by means of melting of the above monofilament-form thermally adhesive organic fiber (heat-bondable organic fiber), a coat (film) by melting of the above organic fiber was not substantially formed on the surface of the above glass fiber.

Comparative Example 4

Very fine glass fiber (87% by weight) of C glass having an average fiber size of 0.6 μm, 10% by weight of monofilament-form polyethylene terephthalate thermally non-adhesive organic fiber (non-heat-bondable organic fiber) (melting point: 245° C.) having an average fiber size of 0.8 dtex and an average fiber length of 5 mm and 3% by weight of monofilament-form copolymerized polyester thermally adhesive organic fiber (heat-bondable organic fiber) (melting point: 110° C.) having an average fiber size of 2.2 dtex and an average fiber length of 5 mm were made into wet paper sheet by a wet papermaking process under an acidic condition of pH 3.0, dried by heating and further heated in a heating furnace at 160° C. for 2 minutes to give a separator for a valve regulated lead-acid battery where thickness was 1.0 mm, basis weight was 160 g/m$^2$ and density was 0.160 g/m$^3$. When the resulting separator was observed, although the fiber materials comprising the above glass fiber and the above monofilament-form thermally non-adhesive organic fiber (non-heat-bondable organic fiber) were bonded each other by means of melting of the above monofilament-form thermally adhesive organic fiber (heat-bondable organic fiber), a coat (film) by melting of the above organic fiber was not substantially formed on the surface of the above glass fiber.

Comparative Example 5

Very fine glass fiber (78% by weight) of C glass having an average fiber size of 0.6 μm, 10% by weight of monofilament-form polyethylene terephthalate thermally non-adhesive organic fiber (non-heat-bondable organic fiber) (melting point: 245° C.) having an average fiber size of 0.8 dtex and an average fiber length of 5 mm and 12% by weight of monofilament-form copolymerized polyester thermally adhesive organic fiber (heat-bondable organic fiber) (melting point: 110° C.) having an average fiber size of 2.2 dtex and an average fiber length of 5 mm were made into wet paper sheet by a wet papermaking process under an acidic condition of pH 3.0, dried by heating and further heated in a heating furnace at 160° C. for 2 minutes to give a separator for a valve regulated lead-acid battery where thickness was 1.0 mm, basis weight was 160 g/m$^2$ and density was 0.160 g/m$^3$. When the resulting separator was observed, although the fiber materials comprising the above glass fiber and the above monofilament-form thermally non-adhesive organic fiber (non-heat-bondable organic fiber) were bonded each other by means of melting of the above monofilament-form thermally adhesive organic fiber (heat-bondable organic fiber), a coat (film) by melting of the above organic fiber was not substantially formed on the surface of the above glass fiber.

After that, each of the separators prepared in the above Examples 1 to 4 and Comparative Examples 1 to 5 was subjected to the following tests for its properties and the results are shown in Table 1.

(Piercing Strength (Puncture Strength))

A sample was sandwiched between jigs made of SUS having a hole of 15 mm diameter, an iron rod of 2 mm diameter was pierced from the upper area of the sample and the maximum load until the sample was broken was measured and divided by the thickness to calculate a piercing strength (puncture strength).

(Tensile Strength)

Measurement was conducted according to a method mentioned in SBA S 0402 (Standards of Battery Association) to give a tensile strength.

(Liquid-Holding Property)

A sample was cut into a size of 10 cm square and dried at 105° C., its dry weight ($W_0$) was measured, then the sample after the measurement of the weight was dipped in a vat charged with pure water for 1 hour, the wet sample was pulled out, a liquid-containing weight ($W_1$) when the interval of water droppings from the sample at ordinary temperature and ordinary humidity became 5 seconds or longer was measured and a liquid-holding property was calculated by the following formula.

Liquid-Holding Property (%)=($W_1-W_0$)/$W_1\times 100$ (Ultrasonic Sealing Property)

A sample was bonded by melting by means of ultrasonic wave using an ultrasonic melting-bonding apparatus, a tensile test was conducted at a tensile velocity of 25 mm/minute and evaluation was done giving a rank of ○, Δ or x where the sample was broken (at the area other than the bonded part), where it was detached from the bonded part or where no bonding took place, respectively.

mally non-adhesive organic fiber (non-heat-bondable organic fiber) and 5 to 10% by weight of single-material monofilament-form thermally adhesive organic fiber (heat-bondable organic fiber) comprising the same kind of material as that for the above monofilament-form thermally non-adhesive organic fiber (non-heat-bondable organic fiber), the outcome is that the fiber materials comprising the above glass fiber and the above monofilament-form thermally non-adhesive organic fiber (non-heat-bondable organic fiber) are bonded each other by thermal fusion of the above monofilament-form thermally adhesive organic fiber (heat-bondable organic fiber) without substantial formation of a coat (film) by melting of the above organic fiber on the surface of the above glass fiber in which the piercing strength (puncture strength) and the tensile strength are as high as 5.1 to 6.5 N/mm and 8.5 to 11.2 N/10 $mm^2$, respectively whereby they have a sufficient strength upon assembling of battery and a liquid-holding property which is important in view of properties of battery is also as high as 86 to 89%. In addition, their ultrasonic sealing property is also good and they are able to cope with a broad using methods (processing into envelope) upon designing of a battery.

(2) On the other hand, as compared with the separator of Example 2 prepared by using 10% by weight of polyester-based monofilament-form thermally non-adhesive organic fiber (non-heat-bondable organic fiber) and 10% by weight of polyester-based monofilament-form thermally adhesive organic fiber (heat-bondable organic fiber), the outcome in the case of the separator of Comparative Example 1 using pulp-form polyethylene fiber as a thermally adhesive organic fiber (heat-bondable organic fiber) is that a liquid-holding property is as very bad as 79% due to inhibition of wetting with respect to an electrolytic solution because of formation of a coat (film) by melting of the pulp-form polyethylene fiber on the surface of the glass fiber. In addition, although the

TABLE 1

| Items | Units | Examples | | | | Comparative Examples | | | | |
|---|---|---|---|---|---|---|---|---|---|---|
| | | 1 | 2 | 3 | 4 | 1 | 2 | 3 | 4 | 5 |
| Material Constitutions | | | | | | | | | | |
| Glass fiber | wt % | 84 | 80 | 90 | 85 | 80 | 80 | 87 | 87 | 78 |
| Monofilament-form polyethylene terephthalate fiber | wt % | 8 | 10 | 5 | 9 | 10 | 10 | 3 | 10 | 10 |
| Monofilament-form copolymerized polyester fiber | wt % | 8 | 10 | 5 | 6 | — | — | 10 | 3 | 12 |
| Monofilament-form polyethylene fiber | wt % | — | — | — | — | — | 10 | — | — | — |
| Pulp-form polyethylene fiber | wt % | — | — | — | — | 10 | — | — | — | — |
| Properties | | | | | | | | | | |
| Thickness | mm | 1.0 | 1.0 | 1.0 | 1.0 | 1.0 | 1.0 | 1.0 | 1.0 | 1.0 |
| Density | g/$cm^3$ | 0.160 | 0.160 | 0.160 | 0.160 | 0.155 | 0.160 | 0.160 | 0.160 | 0.160 |
| Piercing strength (Puncture strength) | N/mm | 5.5 | 6.5 | 5.1 | 6.2 | 5.3 | 5.4 | 3.3 | 5.3 | 6.5 |
| Tensile strength | N/10 $mm^2$ | 10.5 | 11.2 | 8.5 | 8.8 | 6.1 | 6.3 | 8.9 | 6.3 | 11.8 |
| Maximum pore diameter | μm | 13 | 14 | 13 | 14 | 14 | 14 | 14 | 14 | 14 |
| Liquid-holding property | % | 88 | 86 | 89 | 89 | 79 | 85 | 88 | 87 | 83 |
| Ultrasonic sealing property | — | ○ | ○ | ○ | ○ | Δ | Δ | ○ | x | ○ |

From the result of Table 1, the followings were found.

(1) In the separators of Examples 1 to 4 prepared by blending in a wet papermaking process of 80 to 90% by weight of glass fiber having an average fiber size of 1.5 μm or less, 5 to 10% by weight of single-material monofilament-form therpiercing strength (puncture strength) thereof is as good as 5.3 N/mm, its tensile strength is as low as 6.1 N/10 $mm^2$. Moreover, in an ultrasonic sealing test, although the ultrasonic sealing itself is possible, the sealed part is detached before breakage of the sample.

(3) Further, as compared with the separator of Example 2 prepared by using 10% by weight of polyester-based monofilament-form thermally non-adhesive organic fiber (non-heat-bondable organic fiber) and 10% by weight of polyester-based monofilament-form thermally adhesive organic fiber (heat-bondable organic fiber), the outcome in the separator of Comparative Example 2 using monofilament-form polyethylene fiber as a thermally adhesive organic fiber (heat-bondable organic fiber) is that, although the piercing strength (puncture strength) is as good as 5.5 N/mm, its tensile strength is as low as 6.3 N/10 mm$^2$ because the thermally non-adhesive organic fiber (non-heat-bondable organic fiber) and the thermally adhesive organic fiber (heat-bondable organic fiber) therefor are different kind of material and an adhesive action due to thermal fusion of the thermally adhesive organic fiber (heat-bondable organic fiber) to the thermally non-adhesive organic fiber (non-heat-bondable organic fiber) is not highly achieved. In addition, in an ultrasonic sealing test, although the ultrasonic sealing itself is possible, the sealed part is detached before breakage of the sample.

(4) Furthermore, as compared with the separator of Example 2 prepared by using 10% by weight of monofilament-form thermally non-adhesive organic fiber (non-heat-bondable organic fiber) and 10% by weight of monofilament-form thermally adhesive organic fiber (heat-bondable organic fiber), the outcome in the separator of Comparative Example 3 where the amount of monofilament-form thermally non-adhesive organic fiber (non-heat-bondable organic fiber) is 3% by weight is that, although tensile strength is as good as 8.9 N/10 mm$^2$, its piercing strength (puncture strength) is as low as 3.3 N/mm.

(5) Still further, as compared with the separator of Example 2 prepared by using 10% by weight of monofilament-form thermally non-adhesive organic fiber (non-heat-bondable organic fiber) and 10% by weight of monofilament-form thermally adhesive organic fiber (heat-bondable organic fiber), the outcome in the separator of Comparative Example 4 where the amount of monofilament-form thermally adhesive organic fiber (heat-bondable organic fiber) is 3% by weight is that, although the piercing strength (puncture strength) is as good as 5.3 N/mm, its tensile strength is as low as 6.3 N/10 mm$^2$. In addition, in an ultrasonic sealing test, the ultrasonic sealing itself is impossible.

(6) Still furthermore, as compared with the separator of Example 2 prepared by using 10% by weight of monofilament-form thermally non-adhesive organic fiber (non-heat-bondable organic fiber) and 10% by weight of monofilament-form thermally adhesive organic fiber (heat-bondable organic fiber), the outcome in the case of a separator of Comparative Example 5 where the amount of monofilament-form thermally adhesive organic fiber (heat-bondable organic fiber) is 12% by weight, the amount of organic fiber (organic component) is 22% by weight and the amount of glass fiber is 78% by weight is that, although the piercing strength (puncture strength) and the tensile strength are as good as 6.5 N/mm and 11.8 N/10 mm$^2$, respectively, its liquid-holding property is as bad as 83% due to a reduction in the wetting with respect to an electrolytic solution.

What is claimed is:

1. A separator for a valve regulated lead-acid battery, wherein the separator which has a piercing strength of 4.5 N/mm or more and a tensile strength of 7.0 N/10 mm$^2$ or more, comprises a paper sheet made by blending 80 to 90% by weight of glass fiber having 1.5 μm or less average fiber size, 5 to 10% by weight of single-material monofilament-form thermally non-adhesive organic fiber and 5 to 10% by weight of single-material monofilament-form thermally adhesive organic fiber in a wet papermaking process, wherein 1) said single-material monofilament-form thermally non-adhesive organic fiber is a polyethylene terephthalate fiber and said single-material monofilament-form thermally adhesive organic fiber is a copolymerized polyester fiber; or 2) said single-material monofilament-form thermally non-adhesive organic fiber is a polypropylene fiber and said single-material monofilament-form thermally adhesive organic fiber is a polyethylene fiber;

whereupon the fiber materials of the above glass fiber and the above monofilament-form thermally non-adhesive organic fiber are bonded each other by an adhesive component made by thermal fusion of the above monofilament-form thermally adhesive organic fiber whereby a coat by melting of the above monofilament-form thermally adhesive organic fiber is not substantially formed on the surface of the above glass fiber except the surface in contact with the above monofilament-form thermally adhesive organic fiber.

2. A valve regulated lead-acid battery, comprising:
a positive plate;
a negative plate; and
the separator of claim 1 interposed between said positive plate and said negative plate.

* * * * *